United States Patent
Zhang et al.

(10) Patent No.: US 12,554,777 B1
(45) Date of Patent: Feb. 17, 2026

(54) SOFTWARE APPLICATION BOUNDARY DETECTION

(71) Applicant: Amazon Technologies, Inc., Seattle, WA (US)

(72) Inventors: Jiangtao Zhang, Pleasanton, CA (US); Boyu Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 18/538,784

(22) Filed: Dec. 13, 2023

(51) Int. Cl.
*G06F 16/906* (2019.01)
*G06F 16/901* (2019.01)
*G06F 18/2321* (2023.01)

(52) U.S. Cl.
CPC ........ *G06F 16/906* (2019.01); *G06F 16/9024* (2019.01); *G06F 18/2321* (2023.01)

(58) Field of Classification Search
CPC . G06F 16/9024; G06F 16/906; G06F 18/2321
USPC .................. 717/154–157, 159–161
See application file for complete search history.

(56) References Cited

U.S. PATENT DOCUMENTS

| | | | |
|---|---|---|---|
| 11,366,709 B2* | 6/2022 | Aghajanyan | G06F 9/542 |
| 11,385,892 B1* | 7/2022 | Zhang | G06F 16/9535 |
| 11,425,054 B1* | 8/2022 | Dunsmore | H04L 47/828 |

OTHER PUBLICATIONS

Zykin et al., "The Boundary Identification Algorithm for a Process Control", 2022, IEEE, 4 pages. (Year: 2022).*
Kim Clark, "Application Boundaries Combine the Flexibility of Mcroservices with the Manageability of Applications", 2023, retrieved from https://community.ibm.com/community/user/blogs/kim-clark1/2023/07/19/app-boundaries , 3 pages. (Year: 2023).*

* cited by examiner

*Primary Examiner* — Ted T. Vo
(74) *Attorney, Agent, or Firm* — Nicholson DeVos Webster & Elliott LLP

(57) ABSTRACT

Techniques for application boundary detection are described. A request to identify application boundaries within customer software executed in a cloud environment is received. Metadata associated with the customer software is obtained, the metadata including an identification of application units, features associated with each identified application unit, and connectivity between application units. The application units are clustered into initial application unit clusters based at least in part on the features associated with each application unit and the connectivity between application units. The initial application unit clusters are iteratively combined into at least some increasingly larger application unit clusters to generate final application unit clusters. A result including an identification of the application units in the final application unit clusters is output.

20 Claims, 10 Drawing Sheets

SOFTWARE APPLICATION BOUNDARY DETECTION

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various examples in accordance with the present disclosure will be described with reference to the drawings, in which.

DETAILED DESCRIPTION

Figure 1:
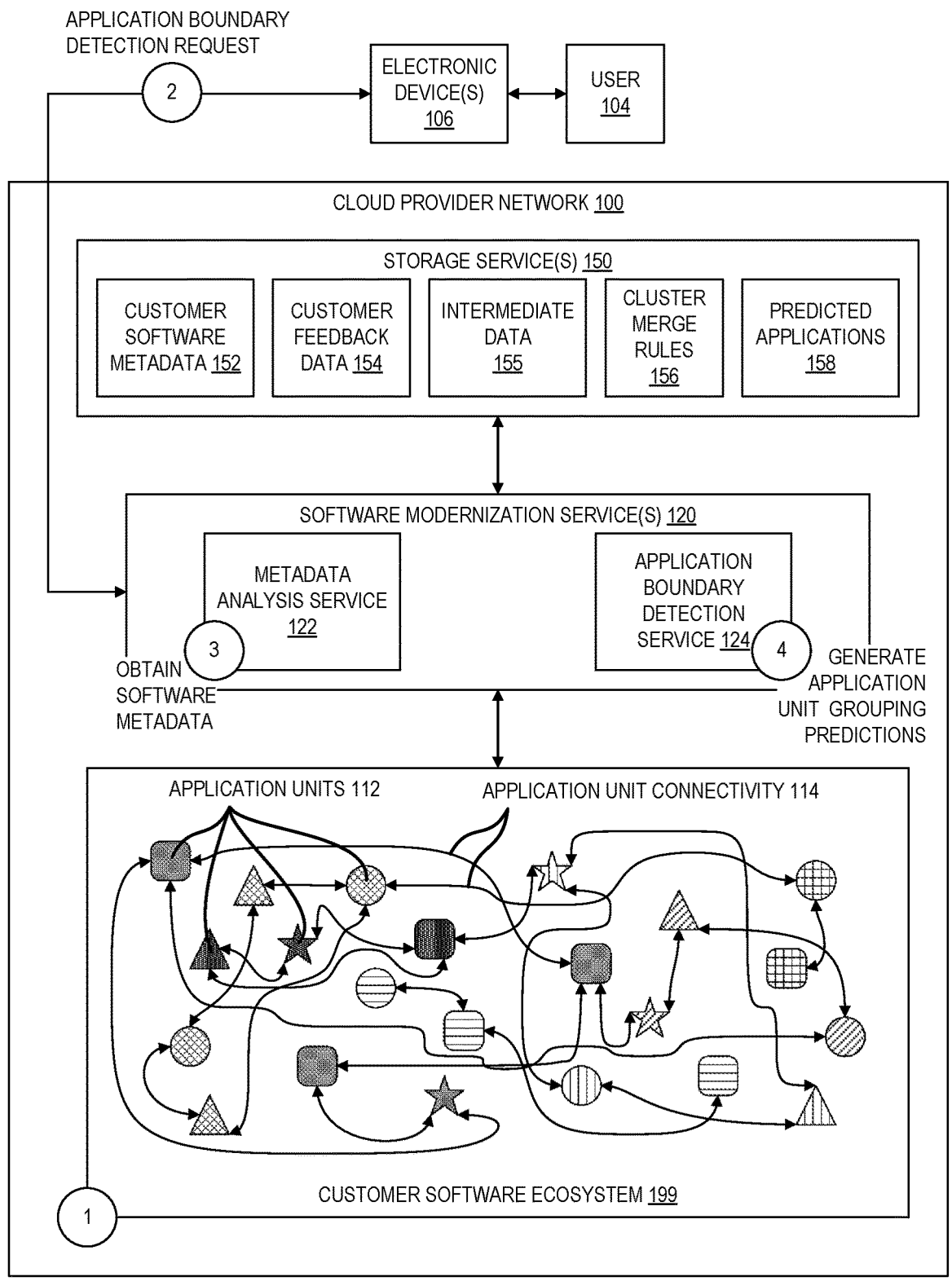
FIG. 1 is a diagram illustrating an environment for application boundary detection according to some examples.

The present disclosure relates to methods, apparatus, systems, and non-transitory computer-readable storage media for application boundary detection. According to some examples, an application boundary detection service groups application units into clusters representing higher order applications. Distinct clusters are thus indicative of application boundaries. The application boundary detection service uses a two-stage approach that leverages machine learning techniques. In the first stage, the application boundary detection service groups application units into an initial set of clusters (also referred to as "small" or "fine" clusters). In the second stage, starting with the initial set of clusters, the application boundary detection service iteratively attempts to create larger clusters until a stopping condition is reached. The resulting clusters of application units indicate predicted boundaries between applications.

An application unit refers to a base building block used to represent the component parts of software applications for purposes of application boundary detection. The particular application unit used in boundary detection can vary depending on the needs of a customer or the availability of data about software ecosystem. For example, the metadata analysis service can perform a runtime level analysis by gathering information about processes executed within the customer's software ecosystem. Under that approach, individual processes can serve as application units. Alternatively, if the software source code is accessible, the metadata analysis service can perform a static code analysis, treating code segments such as classes as individual application units.

In some examples, a metadata analysis service can collect software metadata to generate an identification of a set of application units, their features, and the connectivity amongst the application units. In the cloud provider network setting, other application units that are not executed within by customer-compute resources or authored within customer source code can be inferred by the metadata analysis service, such as cloud-based services called or otherwise invoked by a process, code segment, or other form of application unit. The application boundary detection service can use the data compiled by the metadata analysis service to perform the two-stage clustering process to form clusters of application units corresponding to predicted applications.

In some examples, the application boundary detection service leverages both supervised and unsupervised machine learning techniques. For example, the first-stage can use unsupervised machine learning to generate the initial clusters, and the second-stage can use supervised machine learning to make subsequent grouping determinations. Alternatively, the first-stage can use supervised machine learning to generate the initial clusters, and the second-stage can use unsupervised machine learning to make subsequent grouping determinations. The two stage approach provides benefits from both supervised and unsupervised machine learning techniques. While unsupervised learning techniques can demonstrate high degrees of accuracy, they do not readily lend themselves to incorporating customer feedback. Conversely, with limited customer-specific training data, supervised clustering approaches may demonstrate relatively lower accuracy than their unsupervised counterparts. Combining both approaches leverages the accuracy of unsupervised clustering approaches while allowing for the incorporation of customer feedback to provide improved supervised clustering accuracy.

Application boundary detection has many uses. As organizations expand their software footprint through the introduction of new applications, services, microservices, and dependencies, the task of understanding the organization's software ecosystem can quickly become non-trivial. Nevertheless, characterizing the current state or architecture of an organization's software can be useful in a range of efforts including improving software performance, understanding hosting costs, and modernizing software designs. The techniques described herein leverage machine learning techniques to provide users with rapid insights into their software ecosystem by identifying predicted application boundaries amongst software components, including boundaries that may be otherwise unknown or unintuitive to appreciate. Software developers and other personnel can utilize these insights for tasks ranging from simply gaining a better understanding of their software ecosystem to carrying out software modernization efforts to identify areas where older components or code can be refactored to improve performance, availability, or hosting costs.

FIG. 1 is a diagram illustrating an environment for application boundary detection according to some examples. A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users can interact with a cloud provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

The cloud provider network 100 includes a metadata analysis service 122 and an application boundary detection service 124. Briefly, the metadata analysis service 122 collects metadata about a customer's software to identify a set of application units and their features and connectivity. Additional details regarding the metadata analysis service 122 are illustrated and described with reference to FIG. 3. The application boundary detection service 124 uses a two-stage clustering approach on the application units and features to generate predicted applications and thus predicted boundaries between applications. Additional details regarding the application boundary detection service 124 are illustrated and described with reference to FIGS. 2, 4, and 5. As indicated, identifying application boundaries can provide customers with insights regarding their software ecosystem and modernization opportunities to improve performance, cost, availability, etc.

An application unit serves as the element to be clustered. In some examples, application units can be subdivided into two categories: customer-managed application units and cloud-managed application units. Customer-managed application units include software and systems that the customer has developed and/or deployed to the cloud. Cloud-managed application units include those services or offerings of the cloud network operator that customers can leverage as part of building their software applications. When evaluating a customer's software ecosystem at the runtime level, processes, such as those operating in Linux®-based or Windows®-based environments, can be treated as customer-managed application units. When evaluating a customer's software ecosystem at the source code level, classes or other source level constructs can be treated as customer-managed application units.

To illustrate the distinction between customer- and cloud-managed application units, consider a customer's virtual machine executing a database software application. The processes, including any database processes, executed by that virtual machine could each be considered customer-managed application units. Such customer-managed application units can typically be identified directly in customer metadata through the inspection of the customer compute environments (e.g., as a listing of processes executed in virtual machines or containers, on-demand code execution service functions) or source code. Conversely, a customer may author software to interact with a database provided by a database service of the cloud provider network. That database can itself be considered a cloud-managed application unit, with customer-managed processes that may write data to and read data from the database. Such cloud-managed application units can typically be identified indirectly in customer metadata (e.g., through network traffic to the cloud-provided service, by API calls within the customer's source code to the service, etc.).

Once application units are clustered using the two-stage approach described herein, the clusters of application can represent higher level business applications within the customer's software. For example, one cluster of application units may correspond to a web frontend that serves a website listing a customer's offerings, another cluster may correspond to an ordering system through which those offerings are purchased, and another cluster may correspond to a fulfillment system in which the status of an order is tracked through its delivery to a purchaser. In this manner, an application unit typically corresponds to a relatively low-level component of the customer's software when compared to clusters of application units that can represent higher level business-level applications.

In some examples, the metadata analysis service 122 and/or the application boundary detection service 124 can be part of software modernization services 120. Software modernization services 120 can provide functionality to help customers discover recommended modernization and migration paths for their software applications.

The cloud provider network 100 can include storage services 150 that can object or block level data storage, database storage, etc. An exemplary set of data used as part of the metadata analysis service 122 and/or application boundary detection service 124 is shown. Such data includes customer software metadata 152, customer feedback data 154, intermediate data 155, cluster merge rules 156, and predicted applications 158.

Customer software metadata 152 includes data compiled by the metadata analysis service 122 to identify application units and their features and connectivity for subsequent boundary detection by the application boundary detection service 124.

Customer feedback data 154 can include customer-provided indications of whether previous application boundary predictions were correct. For example, a customer can provide an indication that one application unit should have been grouped with a different cluster. Such customer feedback data can be used in refining a supervised machine learning model used as part of the two-stage clustering approach to application boundary detection.

Intermediate data 155 broadly refers to data generated and used during the application boundary detection. Exemplary intermediate data 155 can include embeddings representing application units or clusters of application units, an identification of clusters of application units at various stages of the boundary detection process (e.g., from the initial clusters to intermediate clusters to the final clusters of application units corresponding to predicted applications).

Cluster merge rules 156 optionally override the machine learning clustering techniques to force or prohibit clustering of certain application units. For example, one rule might dictate that when two application units, an application unit and a cluster of application units, or two clusters of application units have a certain set of common features, the application boundary detection service 124 should combine them into a larger cluster. Conversely, another rule might dictate that when two such objects lack another set of common features, the application boundary detection service 124 cannot combine them into a larger cluster.

Predicted applications 158 correspond to the final clusters of application units as identified by the application boundary detection service 124. Boundaries between applications may be implied by the distinct clusters. In some examples, boundaries may be made explicit, such as where an application unit communication path crosses a cluster boundary.

In FIG. 1, the circles labeled (1)-(4) illustrate an example scenario in which a user initiates application boundary detection for their software. As indicated at circle (1), a customer's software ecosystem 199 is composed of application units 112 represented by shapes having connectivity 114 as indicated. The various shapes are used to represent different types of application units 112 with hashing used to indicate exemplary groupings of application units as distinct applications. Note that the hashed groupings of application units into an application is not typically known prior to boundary detection but presented here to illustrate an example of the application boundary detection.

Application units 112 can correspond to processes such as those executed within virtual machine environments, container environments, as serverless functions, as well as to cloud-managed services between such processes. Note that this formulation in which application units are process-level is illustrative of a runtime level analysis of the customer's software in which the metadata analysis service 122 evaluates the customer's software in execution. In other examples that rely on static code analysis techniques, the software ecosystem 199 can be a representation of the customer's code with application units 112 corresponding to classes, cloud-managed services, etc.

As indicated at circle (2), a user 104 can initiate an application boundary detection of the software ecosystem 199 via an electronic device 106. The electronic device 106 can send a request to identify application boundaries to an API of the software modernization services 120.

In some examples that use static code analysis, the request can include an identification of one or more software repositories that contain the source code and configuration data of the software to be analyzed (e.g., for boundary predictions based on static code analysis). In such a case, at circle (3), the metadata analysis service 122 can retrieve and analyze the source code in the repositories to identify application units in the form of classes (or other software construct) and other, cloud-managed application units implied by the source code (e.g., through function calls to APIs of cloud-provided services). The metadata analysis service 122 can also retrieve other features related to the application units such as authored programming language, target environment, etc.

In some examples that rely on runtime level software analysis, the request can include an indication to analyze the customer's software executing the cloud environment such as software executed by virtual machines, containers, as part of on-demand code execution service functions, etc. In such a case, at circle (3), the metadata analysis service 122 can obtain metadata related to these environments from the various managed compute services. For example, the metadata analysis service 122 can request an identification of each of the virtual machines executing the customer's software from the hardware virtualization service, an identification of each of the customer's functions handled by the on-demand code execution service, and an identification of each of the containers executing on behalf of the customer with the container service. The metadata analysis service 122 can also obtain metadata related to each of these environments from the managed compute services and/or from the environments themselves. For example, the metadata analysis service 122 can request a process list from the identified virtual machines and containers, network configuration data about the environments such as the network address, VPC and subnet of the environment, environment variables (if present), etc. The metadata analysis service 122 can also retrieve network activity from agents executing within the customer environments or from a logging service that tracks network activity such as TCP connections through and across VPCs. Using the network activity to and from the software environments (or to and from the processes or functions), the metadata analysis service 122 can identified other, cloud-managed application units implied by the network activity (e.g., traffic to and from cloud-provided service VPCs).

Whether performing runtime or static code analysis, the metadata analysis service 122 aggregates metadata from various sources to synthesize or otherwise generate a dataset for use in the application boundary detection operations, the dataset including an identification of application units and their features and connectivity. Additional details on an exemplary dataset are illustrated and described with reference to FIG. 3.

At circle (4), the application boundary detection service 124 performs application boundary detection using the two-stage approach detailed herein. In the first stage, the application boundary detection service 124 clusters application units into an initial set of fine clusters of application units.

In some examples, the size of the fine clusters may be artificially constrained through a hyperparameter (e.g., maximum fine cluster size=3 application units). In other examples, the size of the initial clusters may be based on whether a metric generated by the machine learning technique used in the first stage satisfies a threshold.

In the second stage, the application boundary detection service 124 attempts to iteratively combine fine clusters into larger and larger clusters until a stopping condition is reached. When the stopping condition is reached, the resulting application unit clusters represent predicted applications and their boundaries relative to one another. Various stopping conditions can be used, such as when the number of clusters matches a number of distinct applications provided by the customer with the request to identify application boundaries or when metrics generated by the machine learning technique used in the second stage fail to satisfy a threshold permitting further clustering operations.

The various metrics used in clustering determinations in either stage can signal the likelihood that a given cluster (which may be a single application unit) is part of the same application as another cluster (which again may be a single application unit). Example metrics include distance metrics, confidence scores, etc. When a calculated metric representative of a possible clustering of the given cluster with other cluster into a larger cluster satisfies a threshold (e.g., a distance below a certain level, a confidence score above a certain level), the two clusters may be combined into the larger cluster.

Once the stopping condition in the second-stage is reached, the application boundary detection service 124 can store or otherwise output an identification of the final clusters 160 as predicted applications 158. The identification of the final clusters can include a cluster label (e.g., predicted applications A, B, and C) as well as the application units within cluster (e.g., application A includes application units A1, A2, A3; application B includes application units B1 and B2; application C includes application unit C1). Note that the distinct clusters implicitly identify boundaries between applications.

In some examples, the application boundary detection service 124 can store or otherwise output an identification of application boundaries 162 by identifying connections between application units clustered into different final clusters. Filtering the connectivity data for these cross-cluster communications (or to eliminate intra-cluster communications), the application boundary detection service 124 can provide a listing of these cross-cluster boundaries. For example, the application unit connectivity might indicate communications between two application units in different final clusters, such as application units A1 and B2 within predicted applications A and B, respectively. At the same time, the application unit connectivity may also indicate communication between application units A1 and A2 (another application unit within predicted applications A). The application boundary detection service 124 can filter the A1 to A2 connection and present the A1 to B2 connection as an application boundary.

In some examples, the application boundary detection service 124 can output the final clusters as a decomposition recommendation report. Such a report can suggest a way of splitting the customer software into the identified applications based on the final clusters of application units.

Note that the term "two-stage" generally refers to the two application unit clustering stages and is not intended to exclude the presence of additional processing stages (including other clustering operations).

Figure 2:
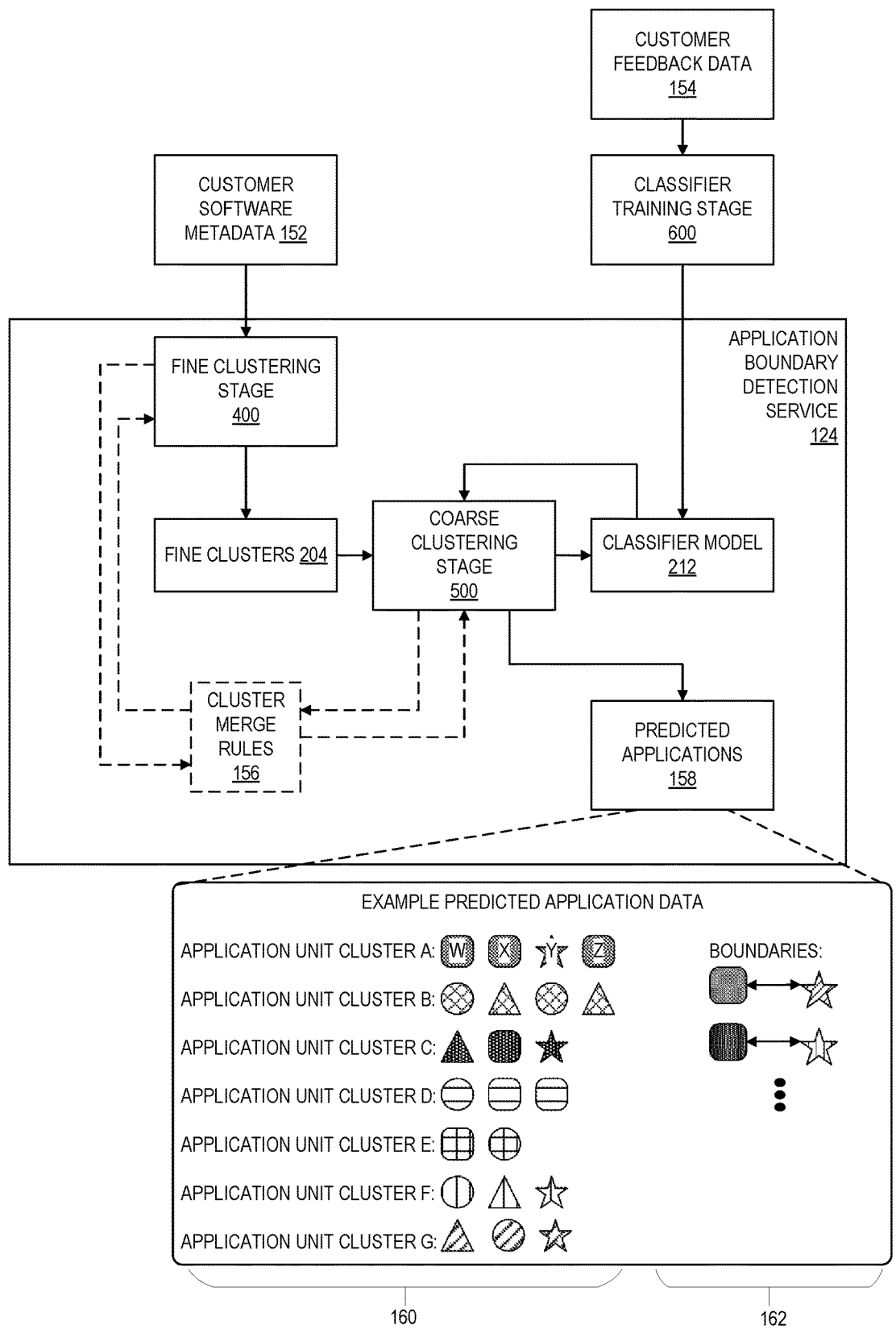
FIG. 2 is a diagram illustrating an application boundary detection service according to some examples.

FIG. 2 is a diagram illustrating an application boundary detection service according to some examples. The application boundary detection service 124 performs clustering of application units in two stages. A fine clustering stage 400 uses the customer software metadata aggregated by the metadata analysis service 122 to generate the initial set of application unit clusters identified as fine clusters 204. Next, a coarse clustering stage 500 attempts to iteratively combine clusters into increasingly larger clusters of application units until a stopping condition is reached. The coarse clustering stage 500 is initialized with the fine clusters 204 and can generate one or more intermediate clusters before reaching a final set of application unit clusters. In the illustrated example, the coarse clustering stage 500 leverages a classifier model 212 in making determinations to combine clusters.

In general, the number of application units will be greater than the number of fine clusters, and the number of fine clusters will be greater than the number of final clusters. To provide a simple example, assume a metadata analysis service 122 has identified an initial set of 1,000 application units. In such a case, the fine clustering stage 400 may generate 300 fine clusters with an average cluster size of 3.3 (note that a fine cluster can be as small as a single application unit). During coarse clustering, the coarse clustering stage 500 may generate 20 final clusters with an average cluster size of 50. Note that not all of the initial set of fine clusters end up combined into larger clusters: a fine cluster in fine clusters 204 may appear as a final cluster provided it was not combined with any other clusters. In some cases, the number of application units may equal the number of fine clusters and/or the number of fine clusters may equal the number of final clusters, subject to the clustering determinations made by the fine or coarse clustering stages 400, 500.

When using machine learning to make clustering decisions, the entity being clustered is generally in the form of an embedding. An embedding is a set of numbers (often in vector form) that provides a numeric representation of some data within a multi-dimensional space (also referred to as a latent space). In the case of application units (or clusters of application units), an embedding numerically represents the features of that application unit (or of the application units in the cluster). An embedding encoder (not shown) can convert the features of an application unit (or cluster of application units) into a corresponding embedding. The embedding encoder may be taken from a pre-trained model that converts the application unit (or cluster) features into the multi-dimensional space such that the distance between less similar application unit (or cluster) embeddings is further apart than the distance between more similar application unit (or cluster) embeddings. Various encoders to convert features into an embedding will be appreciated by those skilled in the art, such as auto-encoders, large language models, etc.

The classifier model 212 can be a neural network model where the network parameters are pre-learned using a training dataset. An exemplary classifier model receives as input embeddings representative of candidate clusters (of one or more application units) to be merged and outputs an indication of whether to merge them. The indication can be a binary value (e.g., a yes or no) or a metric indicative of the confidence that the two candidates are part of the same application.

In some examples, the customer can provide customer feedback data 154 after receiving an initial set of predicted application boundaries. For example, the customer may indicate that a certain application unit predicted to be part of one application is actually a part of another application. A classifier training stage 600 can re-train or refine the classifier model with customer-specific training data based on the customer feedback data 154. By incorporating customer-specific feedback data, more accurate classifier models 212 can be trained and deployed on a per-customer basis to better capture intricacies related to how individual customers have constructed their software ecosystems.

Once a final set of application unit clusters is reached, the application boundary detection service 124 can generate the predicted applications 158. Exemplary predicted application data can include an identification of the clusters (e.g., application unit cluster A, application unit cluster B, and so on) and an identification of the application units within each cluster (e.g., application unit cluster A includes application units W, X, Y, and Z). Application boundaries may be implicit (based on the clusters themselves) or explicit (as shown). In the latter case, various details about the connection between the application units can be provided (e.g., the nature or type of connection).

In some examples, cluster merge rules 156 may be used to bypass or override the machine learning-based clustering decisions described herein. Exemplary rules can be based on the similarity or differences between candidates (whether two application units, an application unit and a cluster of application units, or two clusters of application units). For example, one rule might indicate that when two candidates share certain features, the application boundary detection service 124 should combine them into a larger cluster. Conversely, another rule might dictate that when two such objects do not share certain features, the application boundary detection service 124 cannot combine them into a larger cluster. The application boundary detection service 124 can evaluate the cluster merge rules 156 as part of operations in the fine clustering stage 400 and/or the coarse clustering stage 500.

Figure 3:
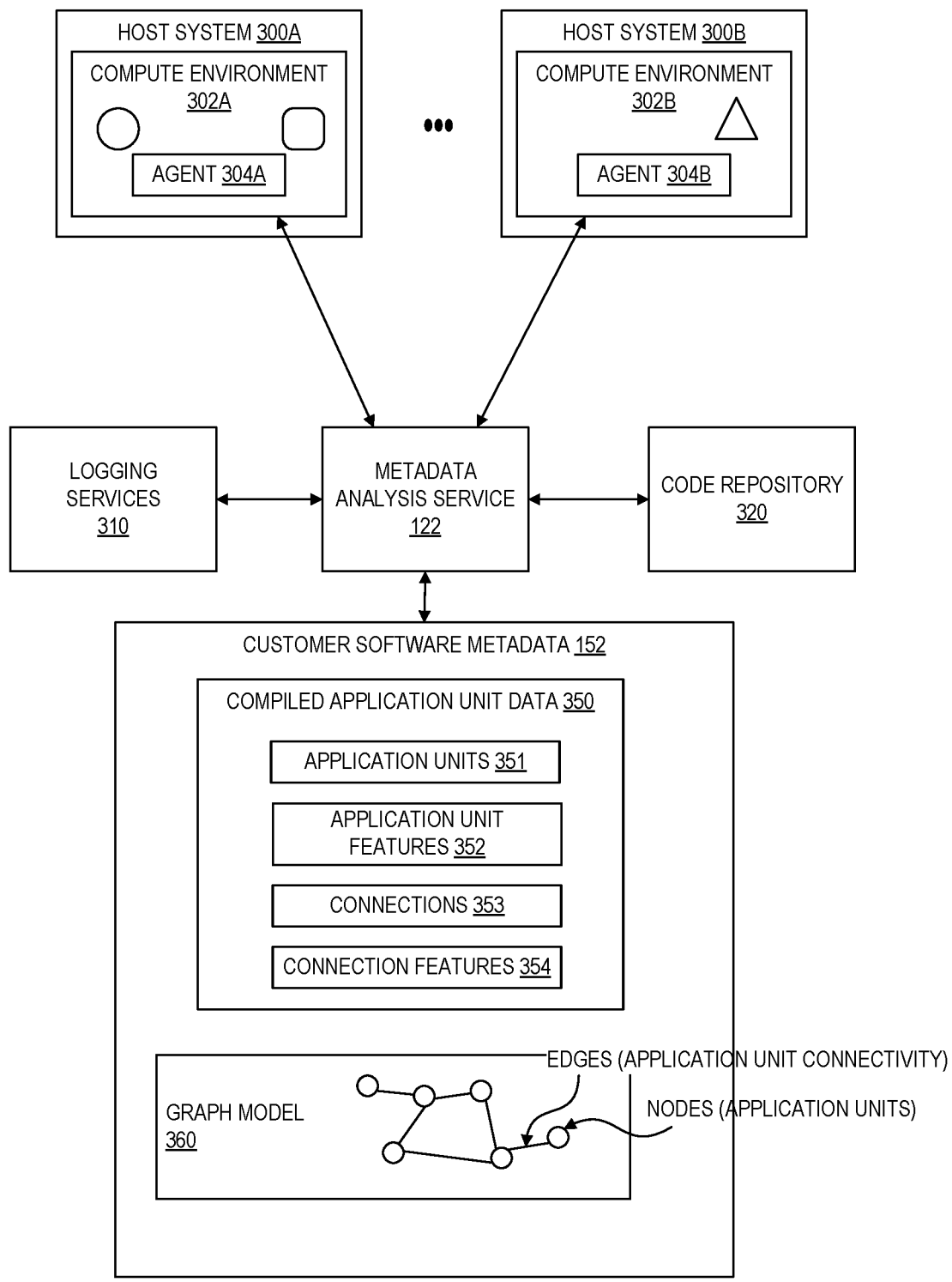
FIG. 3 is a diagram illustrating a metadata analysis service according to some examples.

FIG. 3 is a diagram illustrating a metadata analysis service according to some examples. The metadata analysis service 122 gathers metadata about the customer's software and forms a dataset for use in the application boundary detection operations. As explained in greater detail below, the dataset can include an identification of a set of application units, features associated with each application unit, and an identification of connections between application units. In some examples, the connections themselves can also have associated features.

In examples relying on a runtime analysis where application units include processes, the metadata analysis service 122 can obtain metadata from a variety of different sources. One such source are agents running within the same compute environment as an application unit. For example, host system 300A may be hosting two application units (indicated by square and circle) within a compute environment 302A, such as a virtual machine or container. Host system 300B may be hosting one application unit (indicated by the triangle) within a compute environment 302B. Environments 302A and 302B can also execute agents 304A, 304B. Agents 304 can provide features to the metadata analysis service 122, such features can include process-level information, including an identifications of inter-process communications (e.g., when the environment includes multiple communicating processes) and process-level network communications.

Another metadata source are various logging services 310 of the cloud provider network 100. The metadata analysis service 122 can obtain metadata from the logging service to identify additional application units and connectivity that might not be apparent from data collected by agents. One such service is a network flow logs service that tracks logs network traffic through and across VPCs. The metadata analysis service 122 can retrieve traffic originating from and destined to application units identified by agents.

Another metadata source is a source code repository 320 in which the customer has stored source code of their various cloud-hosted software projects. The metadata analysis service 122 can obtain metadata in the form of source code. In the runtime analysis context, the source code can provide additional features related to various application units such as language, author, last modified date, etc. In the static code analysis context, the source code can provide the customer-managed application units (in the form of classes or other code-level construct) and cloud-managed application units (e.g., by virtue of exercising API calls of cloud-managed services or associated libraries) along with the various code-level features such as language, author, last modified date, etc.

As the metadata analysis service 122 collects data from available data sources, the metadata analysis service 122 can generate an identification of the set of application units that form the customer's ecosystem. Note that cloud-managed application units can be inferred based on network activity between a customer-managed application unit and a cloud-based service. For example, network traffic from a process executing on a customer's virtual machine to a VPC associated with a cloud-managed database service can indicate that the database service is an application unit. To distinguish amongst different databases provided to the customer or to different customers, a feature associated with such an application unit can be a resource identifier of the particular resource of the service being accessed (e.g., a network address, a path, customerid.resourcename, etc.).

An exemplary dataset generated by the metadata analysis service 122 is illustrated as compiled application unit data 350. Compiled application unit data 350 includes an identification of the application units 351, features 352 associated with each application unit, connections 353 between application units, and, optionally, features 354 associated with each connections. Compiled application unit data 350 can be organized in an application unit table and a connectivity table, which may be stored as part of a relational database. An example application unit table follows in which rows corresponds to application units and the columns correspond to application unit features.

| Application Unit | Feature 1 | ... | Feature N |
|---|---|---|---|
| vpc.instance.processid or repo.project.filename.class | ... | ... | ... |
| ... | ... | ... | ... |

Example application units include processes (e.g., vpc.instance.processid) or code segments (e.g., repo.project.filename.class), depending on whether the data is aggregated from using runtime or static code analysis techniques. Other application units include cloud-managed application units such as services (e.g., database service, object storage service, messaging service, etc.) and other cloud-provided endpoints (e.g., load balancer, VPC gateways, etc.) inferred from network traffic metadata (e.g., from customer-managed application units to cloud-managed services) or source code analysis (e.g., API calls).

Example application unit features include process name (for runtime analyses) or class name (for static code analysis), compute type (e.g., the type of compute used to execute the application unit such as a virtual machine, container, on-demand code execution service function), the configuration file associated with launching or executing the compute, environment variables, network address, VPC identifier of the VPC to which the environment is connected, VPC subnet identifier, source code language, source code author, last modified date, etc.

An exemplary connectivity table follows with rows representing connections between application units, each row including an identification of the two application units between which the connection exists.

| Connection | Application Unit 1 | Application Unit 2 | Feature 1 | ... | Feature N |
|---|---|---|---|---|---|
| 1 | <vpc.instance.processid> | Messaging Service | ... | ... | ... |
| ... | ... | ... | ... | ... | ... |

Example connection features include the connection type (e.g., whether inter-process, intra-VPC, or inter-VPC), source and destination ports for network traffic, directionality (e.g., whether the connection is unidirectional or bidirectional). In some examples, connections can have a weight feature. Exemplary weights may be based on the aggregate amount of data transferred over the connection, the number of times a connection was established within a given time interval, etc.

In some examples, the operations of the metadata analysis service 122 are performed without interrupting the customer's software. As a result, different sets of metadata may be gathered for different application units (e.g., an application unit executing with a co-hosted agent may have a more robust set of metadata than one executing without the agent). Additionally, different types of application units may have different available metadata (e.g., a customer-managed application unit might have a process identifier, while a cloud managed database service may be identified with a resource locator). To allow for the variable feature data, features for a given node or edge can include empty or null values.

In some examples, the metadata analysis service 122 generates a graph model 360 of the application units and their connectivity, with application units corresponding to nodes of the graph and connections between application units corresponding to edges of the graph. The graph model can be represented as an adjacency list or matrix.

Figure 4:
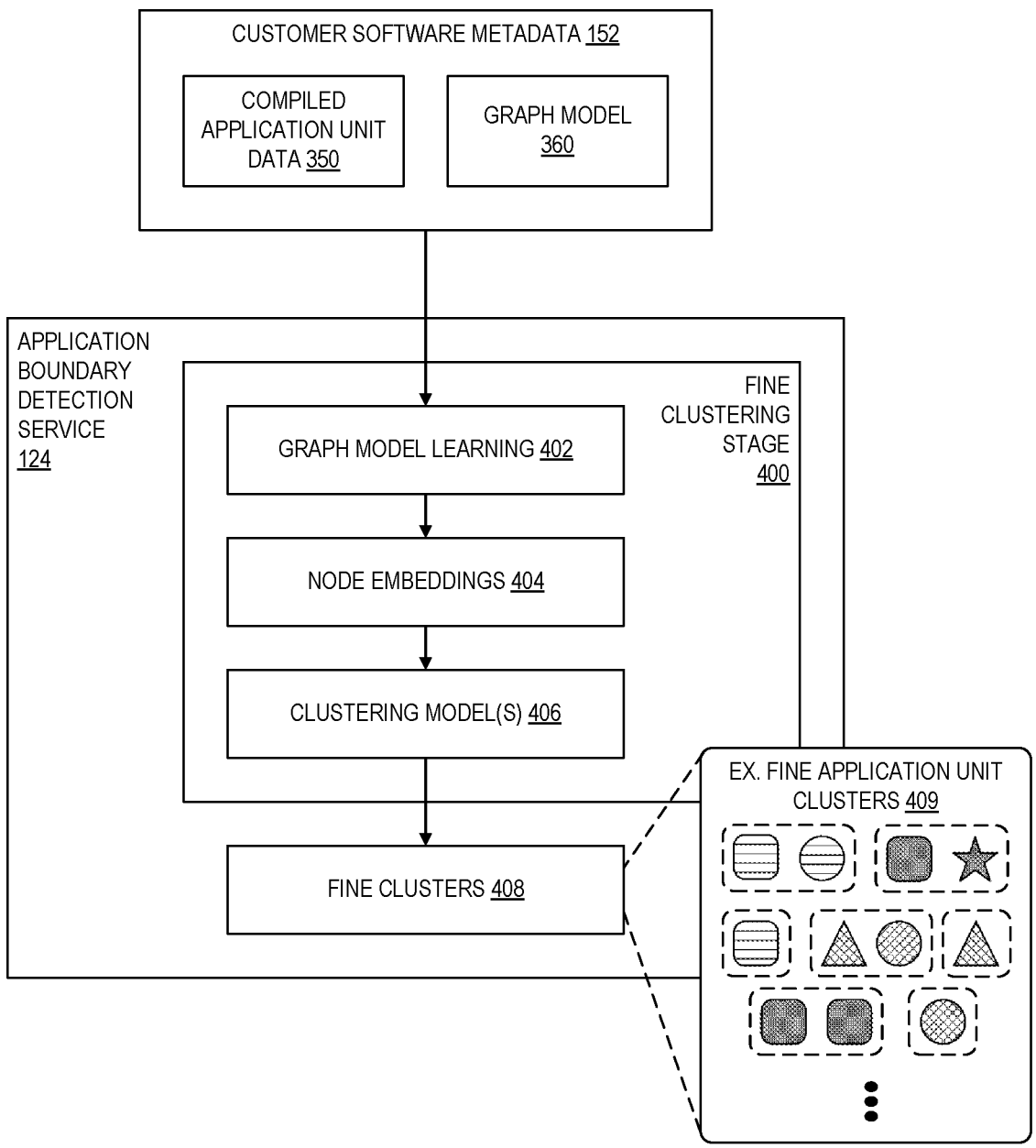
FIG. 4 is a diagram illustrating a fine clustering stage of an application boundary detection service according to some examples.

FIG. 4 is a diagram illustrating a fine clustering stage of an application boundary detection service according to some examples. At a high level, the fine clustering stage 400 uses one or more machine learning techniques to capture the application unit information content contained within the compiled application unit data 350 as embeddings and subsequently cluster those embeddings to generate fine clusters.

An exemplary fine clustering stage is presented that leverages the graph-based structure of application units and their interconnect. Modeling a customer's software ecosystem as a graph such as graph model 360 allows information content about individual application units as well as their connectivity to be captured and used in downstream machine learning tasks. Operations of the exemplary fine clustering stage 400 include graph model learning 402. Graph model learning 402 is a form of unsupervised training in which a graph neural network model learns to encode nodes of graphs as embeddings that capture features of the graph in a latent space. PanRep is one such approach, although other approaches may be used as will be appreciated by those skilled in the art.

Using the encoder of a learned graph neural network model, the fine clustering stage 400 can generate node embeddings 404 where each node embedding corresponds to a node in the graph model 360 (and, since nodes correspond to application units, the node embeddings also correspond to application units).

A clustering model 406 can cluster embeddings such as node embeddings 404 to generate fine clusters 408 of application units. That is, when a clustering model 406 determines to cluster two or more embeddings, the application units corresponding to those embeddings are grouped to form a small cluster. Exemplary clustering models include density-based algorithms such as DBSCAN, centroid-based algorithms such as k-means, and others.

In some examples, the parameters of the clustering model 406 can be specified to limit the size of the fine clusters 406. For example, a cluster model 406 can be implemented with a limit on the number of application units that can be grouped into a fine cluster. As another example, a cluster model 406 can be implemented with a high minimum number of fine clusters relative to the total number of application units. As another example, the metric used by the cluster model 406 to make clustering determinations can be implemented such that the metric is required to satisfy a threshold that provides a high degree in confidence in the clustering decision (in this case, the likelihood that two application units are part of the same application). For example, if a distance metric is used to identify associations between node embeddings, the minimum distance required to make a clustering determination can be tuned to keep the size of the fine clusters small.

In some examples, multiple clustering models 406 can be used to make node embedding clustering determinations. Various degrees of consensus amongst the clustering models 406 can be enforced. In some examples, clustering node embeddings corresponding to application units is permitted when a majority of the clustering models 406 agree on the cluster. In other examples, clustering node embeddings is permitted when all of the clustering models 406 agree on the cluster.

In some examples, the multiple clustering models 406 can make application unit clustering determinations based on different embeddings. For example, one clustering model may cluster embeddings generated by a non-GNN embedding encoder while another clustering model clusters embeddings generated by the node embeddings from a GNN encoder. If the application units corresponding to the separate determinations to cluster the feature embeddings (by the one clustering model) and to cluster the node embeddings (by the other clustering model) agree, the application units can be grouped into a small cluster.

The fine clustering stage 400 can store the fine clusters 408 as intermediate data 155. Example fine clusters 409 are illustrated. As shown, fine clusters can include one or more application units.

Figure 5:
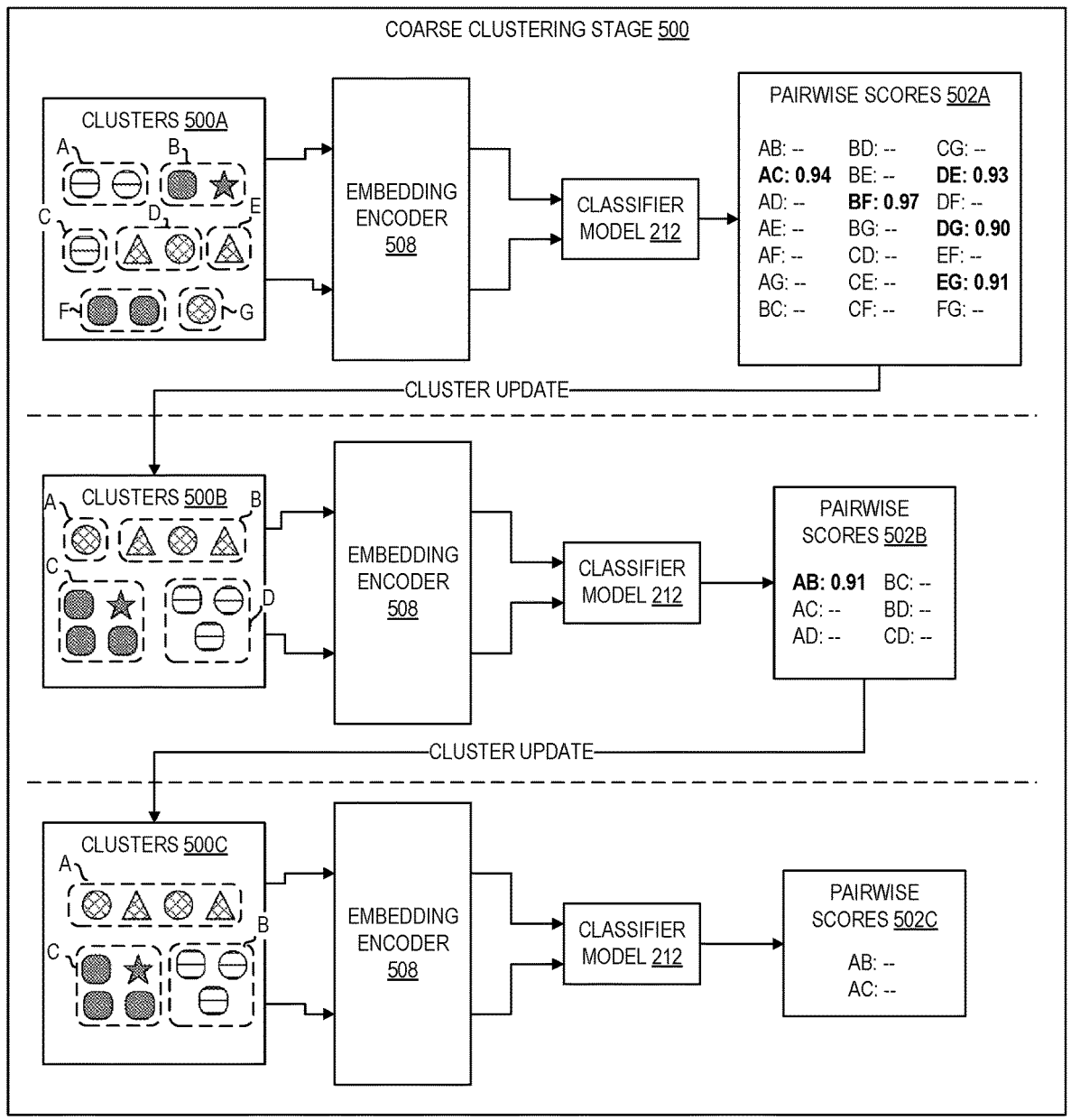
FIG. 5 is a diagram illustrating a coarse clustering stage of an application boundary detection service according to some examples.

FIG. 5 is a diagram illustrating a coarse clustering stage of an application boundary detection service according to some examples. At a high level, the coarse clustering stage 500 iteratively combines clusters of one or more application units into at least some increasingly larger application unit clusters. Note that some clusters may not be combined into larger clusters during coarse clustering based on their relative lack of similarity to other clusters.

In this example, clustering determinations are based on a metric comparing candidate cluster embeddings. Here, the trained classifier model 212 can generate pairwise scores between two cluster embeddings that range from −1.00 to 1.00, where 1.00 corresponds to an estimated certainty that the two embeddings belong to application unit clusters that are part of the same application. Other examples may use other classifier models (e.g., that can score clusters of 3, 4, . . . . N embeddings).

The embeddings used in the evaluation can be generated by an embedding encoder 508 based on the features of the application unit(s) within the cluster. Again, various encoders to convert features into an embedding will be appreciated by those skilled in the art, such as auto-encoders, large language models, etc. The embedding encoder 508 is typically the embedding encoder used to generate embeddings used in the training of the trained classifier model 212.

Initially, the coarse clustering stage 500 is seeded with a set of application unit clusters. Here, that can correspond to the fine clusters 408 from the fine clustering stage 400. An example set of initial clusters is illustrated as clusters 500A. In this example, the clusters 500A have been labeled A through G. In a first pass, the coarse clustering stage 500 calculates the pairwise scores for each of the pairs of clusters 500A, with the score for a given pair indicated in scores 502A by their respective two letter strings. In this example, a minimum score threshold of 0.90 is used in clustering determinations. As shown, pairwise clusters AC, BF, DE, DG, and EG have scores that satisfy the threshold. The coarse clustering stage 500 can treat the scores as a ranked list of potential combinations and combine clusters from the best score to the worst score that still satisfied the threshold. Based on the scores, the coarse clustering stage 500 can combine cluster pairs AC and BF. Note that DE, DG, and EG all satisfy the score threshold. In such an event, the coarse clustering stage 500 can select the pair with the highest score (DE-0.93) in the ranking and discard the other pairs impacted by that combination (e.g., removing from consideration cluster pairs DG and EG). The results of the first pass are shown in clusters 500B.

Clusters 500B have been labeled A through D. In the next (second) pass, the coarse clustering stage 500 calculates the pairwise scores for each of the pairs of clusters 500B, with the score for a given pair indicated in scores 502B by their respective two letter strings. As described above, the coarse clustering stage 500 can identify cluster pair AB as the only candidate combination that meets the threshold. Based on the scores, the coarse clustering stage 500 can combine the cluster pair AB. The results of this second pass are shown in clusters 500C.

Clusters 500C have been labeled A through C. In the next (third) pass, the coarse clustering stage 500 calculates the pairwise scores for each of the pairs of clusters 500C, with the score for a given pair indicated in scores 502C by their respective two letter strings. Here, no pairs satisfy the threshold. Such a scenario is illustrative of one type of stopping condition that can control the operations of the coarse clustering stage 500: when the scores associated with potential combinations of clusters fails to satisfy a threshold, the coarse clustering operations can complete. Another such stopping condition is when the total number of clusters after a pass has been reduced to a number that matches a customer-indicated number of applications. For example, if the customer request to perform application boundary detection indicates that the service should identify ten applications, the coarse clustering stage 500 can continue operations until the number of clusters has been reduced to ten.

Note the threshold used for clustering decisions may be tuned or omitted (instead relying on the ranked selection of pairs) to allow for additional consolidations if the customer-indicated number of applications has not been reached.

More generally, the clustering via classification can be treated as an optimization problem. For example, if the classifier generates scores between −1 and 1, where 1 is the ceiling or highest score (or estimated certainty that two application unit clusters are part of the same application), when clusters are combined based on scores above the threshold but below the ceiling, the difference between the score and ceiling can be treated as an error. With the error and solution space based on the seed clusters and various intermediate clustering operations to reach solutions that satisfy the stopping condition, optimizer application software such as a discrete linear optimizer can be used to narrow and search a solution space to find a solution that minimizes the total error over all passes. Other techniques to perform coarse clustering will be appreciated by those of skill in the art.

In the example fine clustering stage 400 and coarse clustering stage 500 described above, the fine clustering stage 400 leverages unsupervised learning techniques in the form of a GNN and clustering algorithm(s) while the coarse clustering stage 500 leverages a classifier model trained with supervised learning. It is noted that the machine learning techniques used in the fine and coarse clustering stages 400, 500 can be switched. Based on the disclosure and teachings provided herein, a person of ordinary skill in the art will appreciate that a fine clustering stage can leverage a classifier model trained with supervised learning (with some form of limit on the number of application units that can be combined into a single fine cluster) while the coarse clustering stage can leverage unsupervised machine learning techniques (as constrained by a stopping condition).

Figure 6:
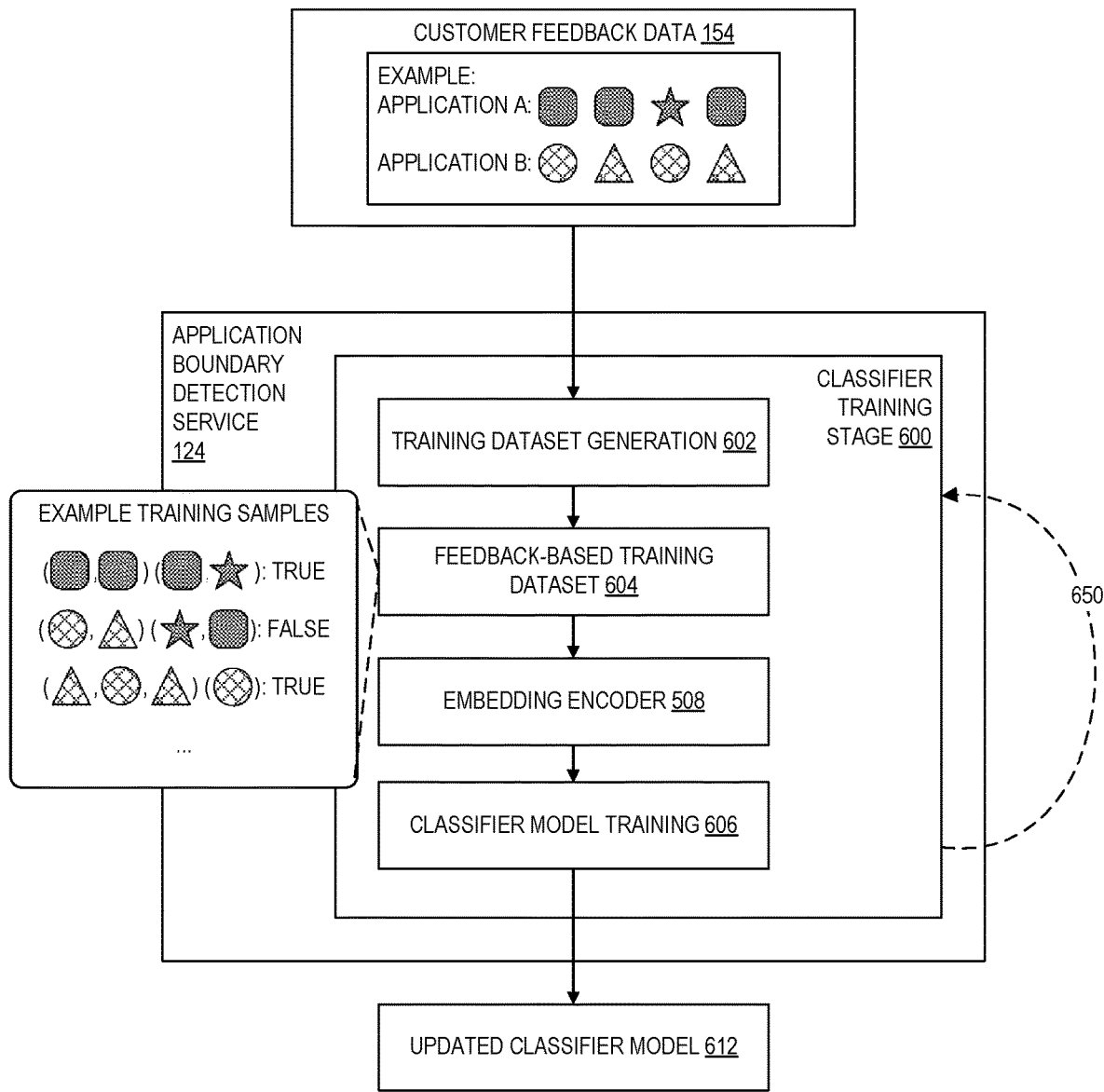
FIG. 6 is a diagram illustrating machine learning model updates according to some examples.

FIG. 6 is a diagram illustrating machine learning model updates according to some examples. As indicated above, the two-stage application boundary detection facilitates the incorporate of customer feedback through supervised machine learning techniques. By incorporating customer-specific feedback data, more accurate classifier models can be trained and deployed on a per-customer basis to better capture intricacies related to how individual customers have constructed their software ecosystems.

Initially, a classifier model such as the classifier model 212 may have been trained based on a general training dataset that contains application units annotated with their associated applications. When such a default classifier model is used to generate predicted applications, those predictions can be sent for presentation to an end user (e.g., via a graphical user interface such as a website). In some examples, application boundary detection service 124 can include an API through which the customer can submit feedback such as by moving application units predicted to be within certain final clusters into other clusters. Example customer feedback data 154 shows that a user may have indicated that certain application units are part of application A and others as part of application B, as indicated.

Exemplary operations of the classifier training stage 600 include training dataset generation 602 and classifier model training 606. Leveraging the customer feedback data 154, training dataset generation 602 generates a feedback-based training dataset 604. An example of such a dataset is illustrated including samples of application unit pairs that belong to the same application (positive samples) and application unit pairs that do not belong to the same application (negative samples). For example, when a customer indicates that an application unit should be included with one application cluster instead of another application cluster, training dataset generation 602 can use that indication to generate many positive and negative samples for the feedback-based training dataset 604. Such samples can include the various combinations of the application units within the application as positive samples and various combinations of the application units across applications as negative samples.

In classifier model training 606, the classifier training stage 600 trains or otherwise updates the or previous classifier model (e.g., a default classifier model or a previously updated classifier model). In some examples, the previous classifier model can be retrained with the original training dataset as expanded by a feedback-based training dataset. In other examples, the previous classifier model can be tuned with the feedback-based training dataset (e.g., by training an adapter). In either case, the embedding encoder 508 used for coarse clustering operations typically generates embeddings from the training dataset 604 for use in during classifier model training 606. The classifier model training 606 can yield an updated classifier model 612 which can then be used by the application boundary detection service 124 (e.g., as classifier model 212 of the other figures).

Note that the operations of the classifier training stage 600 can be repeated as indicated at 650 upon receipt of additional customer feedback to further improve the performance of the classifier model.

Figure 7:
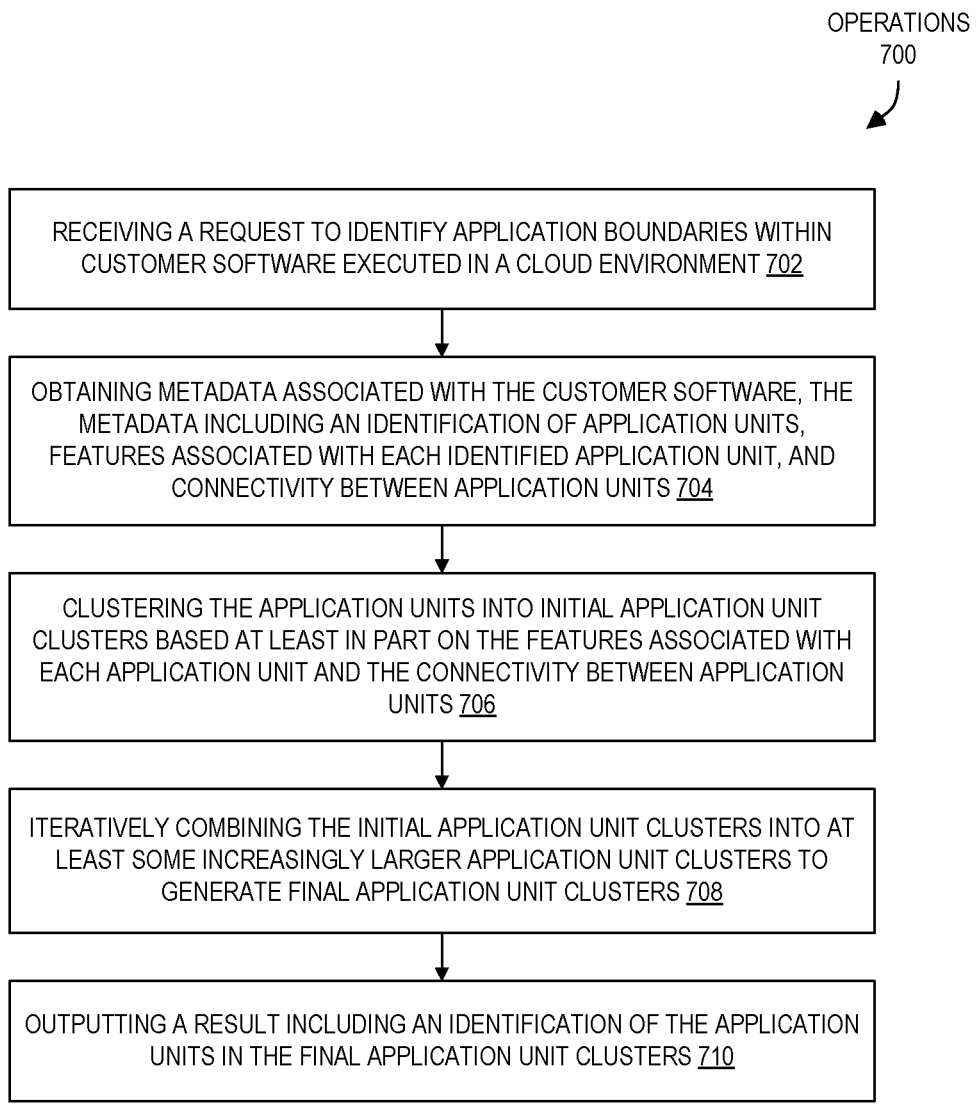
FIG. 7 is a flow diagram illustrating operations of a method for application boundary detection according to some examples.

FIG. 7 is a flow diagram illustrating operations 700 of a method for application boundary detection according to some examples. Some or all of the operations 700 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the metadata analysis service 122 and/or the application boundary detection service 124 of the other figures.

The operations 700 include, at block 702, receiving a request to identify application boundaries within customer software executed in a cloud environment. The operations 700 further include, at block 704, obtaining metadata associated with the customer software, the metadata including an identification of application units, features associated with each identified application unit, and connectivity between application units. The operations 700 further include, at block 706, clustering the application units into initial application unit clusters based at least in part on the features associated with each application unit and the connectivity between application units. The operations 700 further include, at block 708, iteratively combining the initial application unit clusters into at least some increasingly larger application unit clusters to generate final application unit clusters. The operations 700 further include, at block 710, outputting a result including an identification of the application units in the final application unit clusters.

Figure 8:
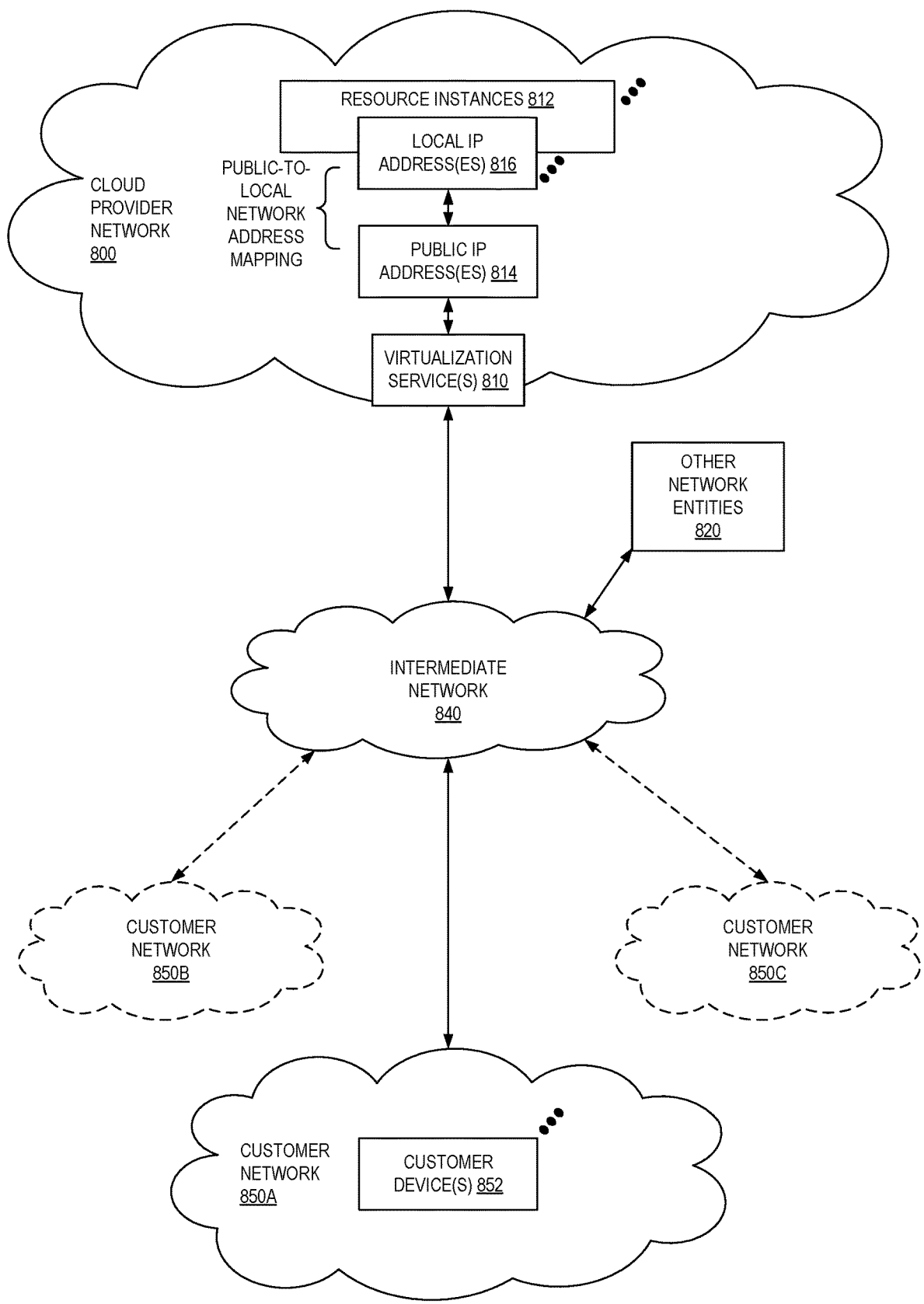
FIG. 8 illustrates an example cloud provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
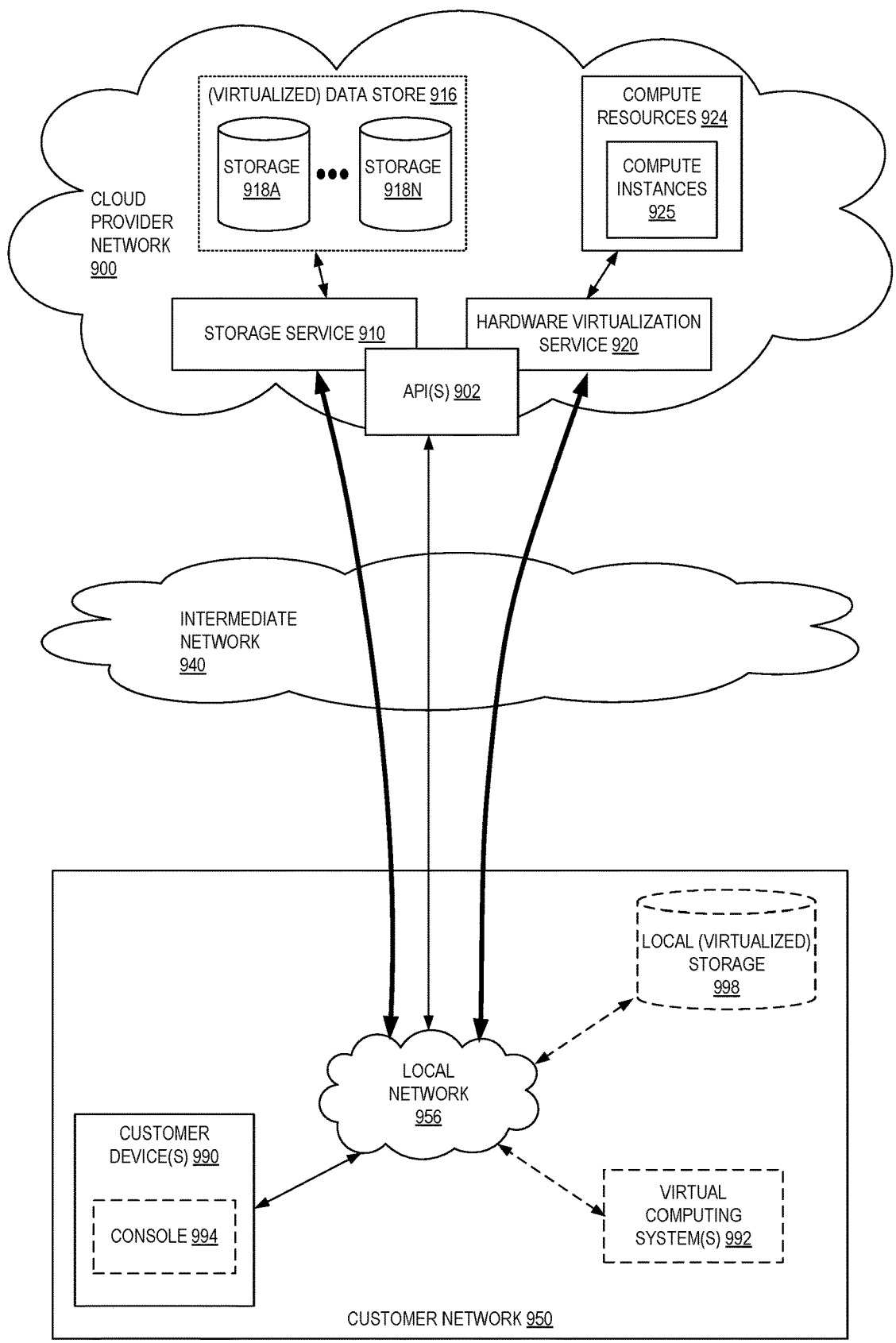
FIG. 9 is a block diagram of an example cloud provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
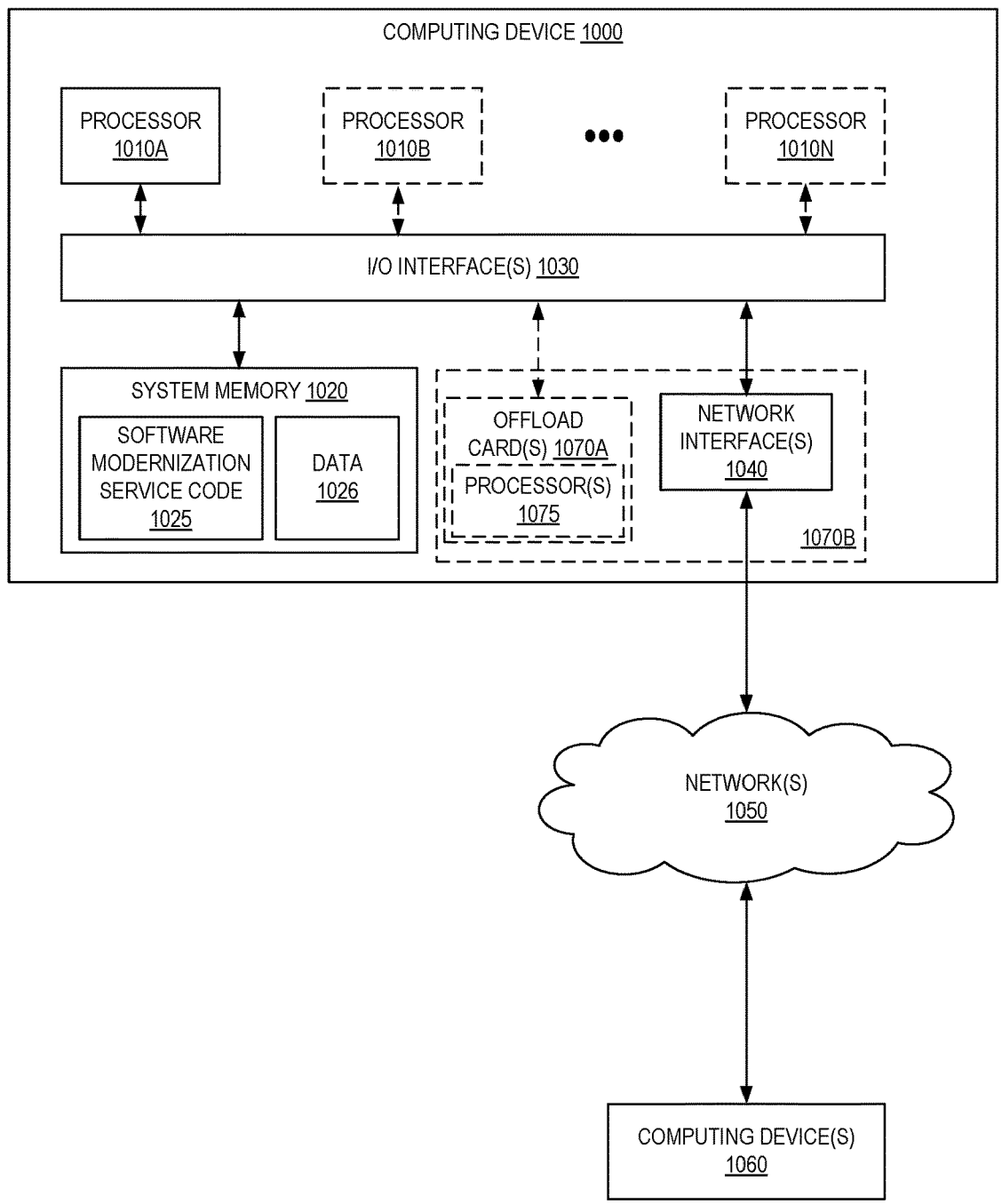
FIG. 10 is a block diagram illustrating an example computing device that can be used in some examples.

In some examples, a system that implements a portion or all of the techniques described herein can include a general-purpose computer system, such as the computing device 1000 (also referred to as a computing system or electronic device) illustrated in FIG. 10, that includes, or is configured to access, one or more computer-accessible media. In the illustrated example, the computing device 1000 includes one or more processors 1010 coupled to a system memory 1020 via an input/output (I/O) interface 1030. The computing device 1000 further includes a network interface 1040 coupled to the I/O interface 1030. While FIG. 10 shows the computing device 1000 as a single computing device, in various examples the computing device 1000 can include one computing device or any number of computing devices configured to work together as a single computing device 1000.

In various examples, the computing device 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as software modernization service code 1025 (e.g., executable to implement, in whole or in part, software modernization services 120 such as the metadata analysis service 122 and/or the application boundary detection service 124) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computing device 1000 and other computing devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computing device 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving a request to identify application boundaries within customer software executed in a cloud environment, the request specifying a number of distinct applications;
   obtaining metadata associated with the customer software within the cloud environment, the metadata providing an identification of application units and features associated with each application unit;
   generating clusters of application units predicted to correspond to distinct applications by:
      generating a graph representing relationships among the application units, the graph including a node for each application unit and edges connecting nodes based on connectivity between application units,
      clustering the application units into initial application unit clusters by providing representations of nodes of the graph to an unsupervised clustering algorithm, wherein a number of initial application unit clusters is greater than the number of distinct applications,
      iteratively combining the initial application unit clusters into increasingly larger clusters of application units until the number of clusters of application units equals the number of distinct applications; and
   outputting a decomposition recommendation for splitting the customer software into the number of distinct applications based on the clusters of application units.

2. The computer-implemented method of claim 1, further comprising generating the representations of nodes in the graph by an encoder of a trained graph neural network model.

3. The computer-implemented method of claim 1, further comprising determining to combine clusters into a larger cluster based on an indication from a trained classifier neural network model.

4. A computer-implemented method comprising:
   receiving a request to identify application boundaries within customer software executed in a cloud environment;
   obtaining metadata associated with the customer software, the metadata including an identification of application units, features associated with each identified application unit, and connectivity between application units;
   clustering the application units into initial application unit clusters based at least in part on the features associated with each application unit and the connectivity between application units;

iteratively combining the initial application unit clusters into at least some increasingly larger application unit clusters to generate final application unit clusters; and outputting a result including an identification of the application units in the final application unit clusters.

5. The computer-implemented method of claim 4, wherein an application unit is a process executing in a cloud environment of the customer or a resource provided by a cloud-managed service.

6. The computer-implemented method of claim 4, wherein an application unit is a class specified in a source code file of the customer or a resource provided by a cloud-managed service.

7. The computer-implemented method of claim 4, wherein clustering the application units into initial application unit clusters comprises clustering, by an unsupervised clustering algorithm, embeddings of the application units.

8. The computer-implemented method of claim 7, further comprising generating the embeddings of the application units by an embedding encoder of a trained graph neural network model.

9. The computer-implemented method of claim 8, further comprising determining to combine a first application unit cluster and a second application unit cluster into a larger application unit cluster by:

generating an embedding of the first application unit cluster and an embedding of the second application unit cluster with another embedding encoder; and obtaining an indication to combine the first application unit cluster and the second application unit cluster by processing the embeddings of the first application unit cluster and the second application unit cluster with a classifier neural network model.

10. The computer-implemented method of claim 9, further comprising:

receiving customer feedback including an indication that a particular application unit included in a first final application unit cluster belongs to a different final application unit cluster;

generating positive and negative training data samples, the positive training data samples indicating that the particular application unit is associated with the different final application unit cluster and the negative training data samples indicating that the particular application unit is not associated with the first final application unit cluster; and training the classifier neural network model with the positive and negative training data samples.

11. The computer-implemented method of claim 9, wherein the initial application unit clusters are iteratively combined into at least some increasingly larger application unit clusters until a stop condition is reached, and wherein the stop condition is when (1) a number of application unit clusters equals a customer-specified number of distinct applications or (2) metrics generated by the classifier neural network model do not satisfy a threshold permitting further combinations.

12. The computer-implemented method of claim 9, wherein clustering the application units into the initial application unit clusters or iteratively combining the initial application unit clusters to generate final application unit clusters is subject to a cluster merge rule that merges clusters of application units based on common features.

13. The computer-implemented method of claim 8, further comprising:

generating a graph representing relationships among the application units, the graph including a node for each application unit and edges connecting nodes based on connectivity between application units; and wherein the trained graph neural network model is trained on the graph.

14. The computer-implemented method of claim 4, wherein the result further includes an identification of application boundaries represented by connections between application units in different final application unit clusters.

15. A system comprising:

a first one or more computing devices to execute customer software in a multi-tenant provider network; and a second one or more computing devices to implement a service in the multi-tenant provider network, the service including instructions that upon execution cause the service to:

receive a request to identify application boundaries within the customer software;

obtain metadata associated with the customer software, the metadata including an identification of application units, features associated with each identified application unit, and connectivity between application units;

cluster the application units into initial application unit clusters based at least in part on the features associated with each application unit and the connectivity between application units;

iteratively combine the initial application unit clusters into at least some increasingly larger application unit clusters to generate final application unit clusters; and output a result including an identification of the application units in the final application unit clusters.

16. The system of claim 15, wherein an application unit is a process executing in a cloud environment of the customer or a resource provided by a cloud-managed service.

17. The system of claim 15, wherein an application unit is a class specified in a source code file of the customer or a resource provided by a cloud-managed service.

18. The system of claim 15, wherein the instructions to cluster the application units into initial application unit clusters includes further instructions that upon execution cause the service to cluster, by an unsupervised clustering algorithm, embeddings of the application units.

19. The system of claim 18, wherein the service includes further instructions that upon execution cause the service to generate the embeddings of the application units by an embedding encoder of a trained graph neural network model.

20. The system of claim 15, wherein the result further includes an identification of application boundaries represented by connections between application units in different final application unit clusters.

* * * * *